: 3,444,276
METHOD FOR PRODUCING CARBON-BONDED GRAPHITE STRUCTURES
Franciszek Olstowski, Freeport, and John D. Watson, Sr., Lake Jackson, Tex., assignors to The Dow Chemical Company, Midland, Mich., a corporation of Delaware
No Drawing. Filed Apr. 4, 1966, Ser. No. 539,717
Int. Cl. B29b 3/00; C01b 31/04
U.S. Cl. 264—29                     9 Claims

ABSTRACT OF THE DISCLOSURE

This invention relates to a process for producing resilient carbon-graphite structures by first admixing vermicular expanded graphite with an organic material capable of being decomposed by heat to form carbon. The admixture is then compressed into a cohered structure having a density of greater than about 0.25 gm./cc. and rapidly pyrolyzed to produce an expansion thereof at least 10% along the axis of compression. Structures produced in this manner find utility as shock absorbers, gasketing, springs and the like and are particularly useful in high temperature or highly corrosive atmospheres.

---

This invention relates to resilient graphite structures and to methods for making such structures and more particularly relates to carbon bonded resilient graphite structures capable of use at extreme temperatures.

There has long been a need for resilient materials which are capable of withstanding extreme temperatures for extended periods of time without losing their resilient properties. Such materials, if available, would be useful as springs for high temperature uses, for high temperature resilient gasketing, e.g., for sealing furnace doors, for cryogenic gaskets and the like. The materials presently available will either not tolerate such temperature extremes or will not retain their resiliency at such temperatures for extended periods of time.

It is an object of this invention, therefore, to provide a resilient material which will withstand lengthy exposure to the extremes of both high and low temperature. Another object is to provide a completely carbonaceous material composed of carbon and graphite which will retain its resiliency at extreme temperatures for extended periods of time. A further object is to provide a process for preparing such materials. These and other objects and advantages of the present invention will become apparent from a reading of the following detailed description.

It has now been discovered that resilient graphite structures may be prepared by admixing vermicular graphite with an organic char-forming substance, uniaxially compressing such mixture to a density greater than about 0.25 gm./cc., and rapidly pyrolyzing the compressed structure in an unconfined manner so that at least 10 percent linear expansion occurs in the axis of compression. The product thus prepared is resilient in the compression axis and such resiliency is retained even at temperatures above 1000° C. and at temperatures below minus 100° C.

The term "vermicular graphite" as used herein, refers to a low density particulate, worm-like form of expanded graphite which may be prepared, for example, by introducing an intercalating agent such as fuming nitric or sulfuric acid mixtures of concentrated nitric and sulfuric acids, bromine and the like between the laminae of particles of natural flake graphite and expanding such treated graphite by heating. Usually a temperature of 500° C. or more is required to achieve good expansion but under some circumstances a lower temperature may be employed. Under these conditions expansion in volume of up to 400 to 500 times usually occurs to produce a very light weight particulate vermicular form of graphite which is easily malleable and compressible into shaped integral structures.

In the first step of this novel process, vermicular graphite is blended with from 5 to 50 percent by weight of an organic char-forming substance. By "organic char-forming substance" is meant any solid or liquid organic material capable of pyrolysis to yield a residual carbon or coke. Such materials include organic liquids such as oils or greases, organic polymers such as phenol-formaldehyde resins, tars, pitches, sugars and the like. Application of such char-forming substances may be by any suitable means which disperses the organic substance more or less uniformly throughout the vermicular graphite mass. Care must be taken, however, in blending or mixing vermicular graphite with other substances not to compact the vermicular graphite and to avoid excessive shearing of the vermicular graphite into small particles. Therefore spraying of liquids or gentle blending or tumbling of solids with the vermicular graphite are particularly effective means. As the amount of char-forming material is decreased to less than about 5% by weight, the amount of resiliency is decreased to the point of being negligible; as the amount of char-forming material is increased to greater than about 50% by weight, the resulting compact tends to exhibit the brittle properties of carbon char.

After mixing the vermicular graphite and the organic char-forming substance, the admixture is compressed into a cohered mass having the density of at least about 0.25 gm./cc. and preferably a density of greater than about 1.0 gm./cc. Such compression is preferably conducted along a single axis. Biaxial compression may also be employed, however, if the degree of compression is substantially greater in one axis than it is in the other. Triaxial, isostatic or radial compression usually do not produce a sufficiently resilient structure. In general, the lower the density of this compact, the more resilient will be the final structure. However, higher densities produce a higher strength and wear resistance and are therefore usually preferred for applications requiring these properties. This compression step may likewise be used to form the vermicular graphite structure into any desired configuration. Additionally, the compressed structures may be cut, sanded, or machined into any desired configuration.

Where curable organic polymers or heat-fusible organic substances are employed as the organic char-forming substances, such substances are preferably cured or heat-fused during or after the compression step and prior to the pyrolysis step.

The compressed graphite structures prepared in the manner discussed above are then pyrolyzed (preferably in a non-oxidizing atmosphere) at a temperature sufficient to decompose the organic char-forming substance to carbon. Such pyrolysis is conducted at a rate such that the expansion of the graphite compact is at least 10 percent and preferably at least 25 percent. Substantially all of the expansion takes place in a direction parallel to that of the axis of greatest compression with little or no expansion occurring along any axis receiving little or no compression. It is desirable to control the pyrolysis rate such that the expansion of the compact is 50-fold or less. Expansions greater than 50-fold generally yield structures having little physical strength.

After pyrolysis and expansion, the carbon bonded graphite mass is a resilient structure having its resiliency in the axis of compression and capable of retaining its resiliency for extended periods of time at extreme conditions of temperature. By resilient is meant that the structure is compressibly deformable at least 10 percent in the original compression axis and upon release of compression forces will regain at least 90 percent of its original thickness in the direction of compression.

Structures prepared in accordance with this invention find utility as shock or impact absorbing material, vibration or sound absorbing materials, springs, resilient gasketing and the like which are particularly valuable in highly corrosive atmospheres and under conditions of extreme heat and cold.

The following examples are provided to further illustrate the invention but are not to be construed as limiting to the scope thereof.

Example 1

A mass of vermicular graphite was gently blended with 10 weight percent of phenol-formaldehyde resin in the form of a fine powder. The blended mass was uniaxially compressed into a block having a density of 1.64 gm./cc. The block was then rapidly heat cured and pyrolyzed by placing it in an oxyacetylene flame for several minutes. The rapid pyrolysis caused the block to expand from a thickness of 0.567 inch to 0.793 inch along the axis of original compression and produced a carbon bonded graphite structure having a density of 1.17 gm./cc. A section measuring 1 inch square by 0.755 inch thick was then cut from the expanded block. Application of 60 p.s.i. pressure to such block reduced the thickness to 0.74 inch. Upon releasing of the pressure, the block re-expanded to a thickness of 0.750 inch. The block was then subjected to a force of 100 p.s.i., the pressure was released and then reapplied for three cycles. At the end of the third cycle the thickness of the uncompressed block was 0.721 inch. This block was inserted into a furnace maintained at a temperature of 960° C. After reaching furnace temperature, cyclic compression tests showed that the block retained its resiliency at this temperature.

Example 2

A mass of expanded graphite was gently mixed with 15 weight percent of a phenol-formaldehyde resin powder. After thorough mixing the mass was uniaxially compressed under a force of about 10,000 p.s.i. and heat cured at a temperature of 400° F. The resulting block had a density of 1.56 gm./cc. and a thickness of about 0.756 cm. The polymer-bonded block thus prepared was rapidly pyrolyzed by being inserted into a furnace at a temperature of 600° C. Within less than 30 minutes, the block had expanded about 3.7 fold in the direction parallel to the original axis of compression to yield a resilient unitary block of carbon-bonded vermicular graphite having an apparent bulk density of 0.42 gm./cc. The block thus prepared had a thickness in the resilient direction of 2.8 centimeters. A compressive force of about 10 p.s.i. was alternately applied to the block and then released. The cycle was repeated with the results as shown below.

| Cycle No. | Non-compressed dimension (centimeters) | Compressed dimension (centimeters) | Amount of deformation in centimeters |
|---|---|---|---|
| 1 | 2.80 | 2.30 | 0.50 |
| 2 | 2.80 | 2.30 | 0.50 |
| 11 | 2.75 | 2.30 | 0.45 |
| 26 | 2.73 | 2.25 | 0.48 |
| 51 | 2.62 | 2.10 | 0.52 |
| 101 | 2.58 | 2.10 | 0.48 |

These tests showed that even after more than one hundred compression cycles this carbon-bonded compressed vermicular graphite block retained its resiliency and over 90% of its original dimensions.

Example 3

A mass of vermicular graphite having an apparent bulk density of about 0.3 pound per cubic foot was blended with 35 weight percent of a finely divided petroleum pitch powder. The blended mass was compressed in a mold to a density of 0.2 gm./cc. A second compression force of 10,000 p.s.i. was applied perpendicular to the first compression to yield a graphite compact having a density of 1.6 gm./cc. The compact was then heated under pressure to 120° C. to fuse the pitch binder. A portion of the slab prepared in this manner measuring 0.145 inch in the direction parallel to the final compression vector was then rapidly heated to 800° C. Within three minutes the graphite slab was pyrolyzed and had swelled in the direction of the final compression vector to a thickness of 0.295 inch (an expansion ratio of about 2:1). The application of 476 p.s.i. parallel to the direction of expansion produced an 18.4 percent deformation. Upon release of the compressive force the structure regained to 99.5 percent of its load free dimension.

In the same manner as above a compact was prepared employing 5 weight percent of a vinyl chloride-vinylidene chloride copolymer as the polymer binder. This bonded compact was rapidly heated to 800° C. in an unconfined manner and swelled to 2.13 times its original thickness in the direction parallel to the compression axis. A sample of this carbon-bonded material measuring 0.347 inch thick was subjected to a compressive force of 84.7 p.s.i. which caused compression of the block to a thickness of 0.300 inch. Upon removal of the compressive force the sample returned to a thickness of 0.343 inch showing about 99 percent recovery of the initial thickness.

We claim:
1. A process for producing resilient carbon-bonded graphite structures which comprises
   (a) admixing vermicular graphite with a thermal decomposable carbon-forming organic material,
   (b) compressing the admixture into a cohered structure having a density of greater than about 0.25 gm./cc., and
   (c) rapidly pyrolyzing the compressed structure to produce a carbon-bonded graphite structure expanded at least 10 percent in the axis of compression.
2. The process of claim 1 wherein the carbon-forming organic material is present in admixture with the vermicular graphite in a quantity of from about 5 to about 50 weight percent.
3. The process of claim 2 wherein the density of the compressed structure prior to pyrolyzing is at least 1.0 gm./cc.
4. The process of claim 2 wherein the organic char-forming substance is a curable organic polymer.
5. The process of claim 4 wherein said curable organic polymer is cured prior to pyrolysis of the compressed structure.
6. The process of claim 5 wherein the curable organic polymer is a phenol-formaldehyde polymer.
7. The process of claim 2 wherein the organic char-forming substance is a heat-fusible organic substance.
8. The process of claim 7 wherein the heat-fusible organic substance is fused by the action of heat prior to pyrolysis of the compresed structure.
9. The process of claim 8 wherein the heat-fusible organic substance is petroleum pitch.

References Cited

UNITED STATES PATENTS

| 3,265,519 | 8/1966 | Diefendorf | 264—29 |
| 3,357,929 | 12/1967 | Olstowski | 264—29 |
| 3,375,308 | 3/1968 | Turkat | 264—29 |

FOREIGN PATENTS

| 991,581 | 5/1965 | Great Britain. |

DONALD J. ARNOLD, *Primary Examiner.*